(12) United States Patent
Xu et al.

(10) Patent No.: US 8,885,897 B2
(45) Date of Patent: Nov. 11, 2014

(54) CLOSED LOOP REGISTRATION CONTROL FOR MULTI-MODALITY SOFT TISSUE IMAGING

(75) Inventors: Sheng Xu, Rockville, MD (US); Jochen Kruecker, Washington, DC (US); Luis Felipe Gutierrez, Jersey City, NJ (US)

(73) Assignee: Koninklijke Philips N.V., Eindhoven (NL)

( * ) Notice: Subject to any disclaimer, the term of this patent is extended or adjusted under 35 U.S.C. 154(b) by 899 days.

(21) Appl. No.: 12/679,026

(22) PCT Filed: Oct. 20, 2008

(86) PCT No.: PCT/IB2008/054315
§ 371 (c)(1),
(2), (4) Date: Apr. 8, 2010

(87) PCT Pub. No.: WO2009/053896
PCT Pub. Date: Apr. 30, 2009

(65) Prior Publication Data
US 2013/0039555 A1    Feb. 14, 2013

Related U.S. Application Data

(60) Provisional application No. 60/982,824, filed on Oct. 26, 2007.

(51) Int. Cl.
G06K 9/00 (2006.01)
G06K 9/40 (2006.01)
G06K 9/36 (2006.01)
G06T 7/00 (2006.01)

(52) U.S. Cl.
CPC ..... *G06T 7/0038* (2013.01); *G06T 2207/10132* (2013.01); *G06T 2207/30084* (2013.01); *G06T 2207/10092* (2013.01); *G06T 2207/10081* (2013.01); *G06T 2207/10136* (2013.01)
USPC ........... 382/128; 382/130; 382/131; 382/275; 382/280

(58) Field of Classification Search
CPC ........... G06T 2207/30004; G06T 2207/10132; G06T 2207/10072; G06T 2207/10116; G06T 2207/20201; G06T 7/0026; G06T 7/0012; G06T 7/0024; G06T 7/0038; G06T 7/20; G06T 19/00; G06T 19/003; G06T 5/00; G06T 5/003; G06T 5/50; A61B 2017/00106
USPC .......................... 382/128, 130, 131, 275, 280
See application file for complete search history.

(56) References Cited

U.S. PATENT DOCUMENTS
6,266,453 B1  7/2001 Hibbard
6,268,611 B1  7/2001 Pettersson et al.
(Continued)

FOREIGN PATENT DOCUMENTS
JP    2006167267 A   6/2006
WO   WO2007066294   6/2007

OTHER PUBLICATIONS
J.M. Blackall et al, Tracking Alignment of Sparse Ultrasound With Preoperative Images of the Liver and an Interventional Plan Using Models of Respiratory Motion and Deformation, Proceedings of the SPIE, vol. 5367, No. 1:218-27, May 25, 2004.
(Continued)

*Primary Examiner* — Amir Alavi
*Assistant Examiner* — Kenny Cese

(57) ABSTRACT

A 3D ultrasound image from a memory is compared with a 3D diagnostic image from a memory by a localizer and registration unit which determines a baseline transform which registers the 3D diagnostic and ultrasound volume images. The target region continues to be examined by an ultrasound scanner which generates a series of real-time 2D or 3D ultrasound or other lower resolution images. The localizer and registration unit compares one or a group of the 2D ultrasound images with the 3D ultrasound image to determine a motion correction transform. An image adjustment processor or program (operates on the 3D diagnostic volume image with the baseline transform and the motion correction transform, to generate a motion corrected image that is displayed on an appropriate display.

25 Claims, 3 Drawing Sheets

(56) References Cited

U.S. PATENT DOCUMENTS

| | | | |
|---|---|---|---|
| 6,390,982 B1 | 5/2002 | Bova | |
| 2003/0199748 A1* | 10/2003 | Camus et al. | 600/407 |
| 2005/0182295 A1* | 8/2005 | Soper et al. | 600/117 |
| 2007/0015991 A1* | 1/2007 | Fu et al. | 600/407 |
| 2007/0167801 A1* | 7/2007 | Webler et al. | 600/459 |
| 2007/0167806 A1 | 7/2007 | Wood et al. | |
| 2007/0179377 A1* | 8/2007 | Carlsen et al. | 600/407 |
| 2007/0238952 A1* | 10/2007 | Boese et al. | 600/407 |
| 2009/0213034 A1* | 8/2009 | Wu et al. | 345/1.1 |

OTHER PUBLICATIONS

R. Alterovitz et al., Needle Insertion and Radioactive Seed Implantation in Human Tissues: Simulation and Sensitivity Analysis, IEEE Conf. on Robotics and Automation, Taipei, Taiwan, May 2003.

D.G. Gobbi et al., "Integration of Intra-Operative 3D Ultrasound with Pre-Operative MRI for Neurosurgical Guidance", Proceedings of the 22nd Annual EMBS International Conference, Jul. 23-28, 2000, Chicago, IL, pp. 1738-1740.

J. Kruecker et al., "Fusion of Realtime Transrectal Ultrasound with Pre-Acquired MRI for Multi-Modality Prostate Imaging", Proceedings of the SPIE, Gellingham, VA, Us, vol. 6509, Mar. 21, 2007, pp. 650912/1-650912/12.

D. Llorett et al., "Motion-Induced Error Correction in Ultrasound Imaging", 3D Data processing Visualization and Transmission, 2002 Proceedings, First International Symposium, Jun. 19-21, 2002, Piscataway, NJ, US, pp. 79-82.

E. Sjolie et al., "Minimal Invasive Abdominal Surgery Based on Ultrasound Vision, Possible?", International Congress Series, Excerpta Medica, Amsterdam, vol. 1230, Jan. 1, 2001, pp. 38-43.

Xu, Sheng et al., "Real-Time Motion Tracking Using 3D Ultrasound", Proceedings SPIE—Medical Imaging 2007: Visualization and Image-Guided Procedures, vol. 6509, Feb. 2007, pp. 6509X1-6509X-8.

* cited by examiner

CLOSED LOOP REGISTRATION CONTROL FOR MULTI-MODALITY SOFT TISSUE IMAGING

The present application relates to the diagnostic imaging arts. It finds particular application in conjunction with targeted prostate biopsies and therapy in which advancement of the biopsy needle is monitored in real time with ultrasound and the real-time ultrasound images are registered with a previously generated diagnostic image, such as a MR or CT image, and will be described with particular reference thereto. However, it is to be appreciated that the present technique is applicable to the kidney, other organs, other types of soft tissue, and to other imaging modalities.

Prostate cancer is the most common non-skin cancer and the second leading cause of cancer death among American men. Transrectal ultrasound (TRUS)-guided needle biopsy is the most frequently used method for diagnosing prostate cancer due to its real-time nature, low cost, and simplicity. However, the use of ultrasound to detect prostate cancer is limited by its relatively poor image quality and by its low sensitivity to prostate and other cancers. That is, ultrasound images provide little, if any, differentiation between cancerous tissues and adjacent tissues. The lack of sonographic visibility by prostate and other cancers creates uncertainty as to whether the potentially cancerous tissue has, in fact, been biopsied. It is estimate that TRUS-guided biopsy fails to detect the presence of prostate cancer correctly in approximately 20% of cases.

Other imaging modalities, such as magnetic resonance imaging, provide superior differentiation of prostate and cancerous tissues. However, magnetic resonance imaging is costly, typically not real-time, and awkward or difficult to use, making it undesirable for routine biopsy guidance.

Magnetic resonance and ultrasound images have been fused or registered. However, due to the differences in resolution, clarity and nature of anatomical markers, the difference in contrast, the difference in image characteristics, and other differences between magnetic resonance and ultrasound images, reliable automated registration of real-time ultrasound images and volume MR images has proved elusive. Simple visual comparison without joint, side-by-side or fused display is today the gold standard for using pre-acquired magnetic resonance images during realtime ultrasound-guided procedures.

The present application describes a new and improved apparatus and method which overcomes these problems and others.

In accordance with one aspect, an image registration apparatus is provided. A diagnostic volume image memory receives a 3D diagnostic volume image of a target area generated by a scanner. An ultrasound volume image memory stores a 3D ultrasound volume image of the target area. A localizer and registration unit determines a baseline transform that brings the 3D diagnostic volume image and the 3D ultrasound image of the target area into registration. An image adjustment processor adjusts at least a selected portion of the diagnostic volume image in accordance with the baseline transform.

In accordance with another aspect, a method of semi-automatically registering a 3D diagnostic volume image of a target region with a 3D ultrasound volume image of the target region is provided. Registration along a first dimension or subset of dimensions is automatically optimized A display depicting the 3D diagnostic image and the 3D ultrasound volume image registered in the first dimension is presented. At least one of a manual adjustment to the registration or operator approval of the registration is received. These steps are repeated for each of a plurality of additional dimensions. A baseline transform is determined which registers the 3D diagnostic volume image and the 3D ultrasound volume image.

In accordance with another aspect, an image registration method is provided. A 3D diagnostic volume image of a target region and a 3D ultrasound volume image of the target region are registered to generate a baseline transform which transforms the 3D diagnostic and ultrasound volume images into registration. A series of real-time ultrasound images are generated. The real-time ultrasound images are registered with the 3D diagnostic image to generate a motion correction transform which transforms at least a portion of the 3D ultrasound volume image and the real-time ultrasound image into registration. At least a corresponding portion of the 3D diagnostic volume image is operated on with the baseline transform and the motion correction transform to bring at least the corresponding portion of the 3D diagnostic volume image into registration with the real-time ultrasound image.

One advantage is that it facilitates accurate or semi-automatic baseline registration of magnetic resonance and ultrasound images.

Another advantage of the present application resides in the real-time intra-operative registration of ultrasound images and a three-dimensional volume image, e.g., a magnetic resonance or CT image.

Another advantage resides in improved guidance accuracy in soft tissue biopsies.

Another advantage is that the accuracy of the image fusion is determined only by the image registrations, which is independent of the tracking system.

Another advantage is that fusion accuracy is not affected by the metal distortion of the electromagnetic field of the tracking system.

Another advantage is that the system does not need any fiducials for registration.

Still further advantages and benefits will become apparent to those of ordinary skill in the art upon reading and understanding the following detailed description.

The invention may take form in various components and arrangements of components, and in various steps and arrangements of steps. The drawings are only for purposes of illustrating the preferred embodiments and are not to be construed as limiting the invention.

Figure 1:
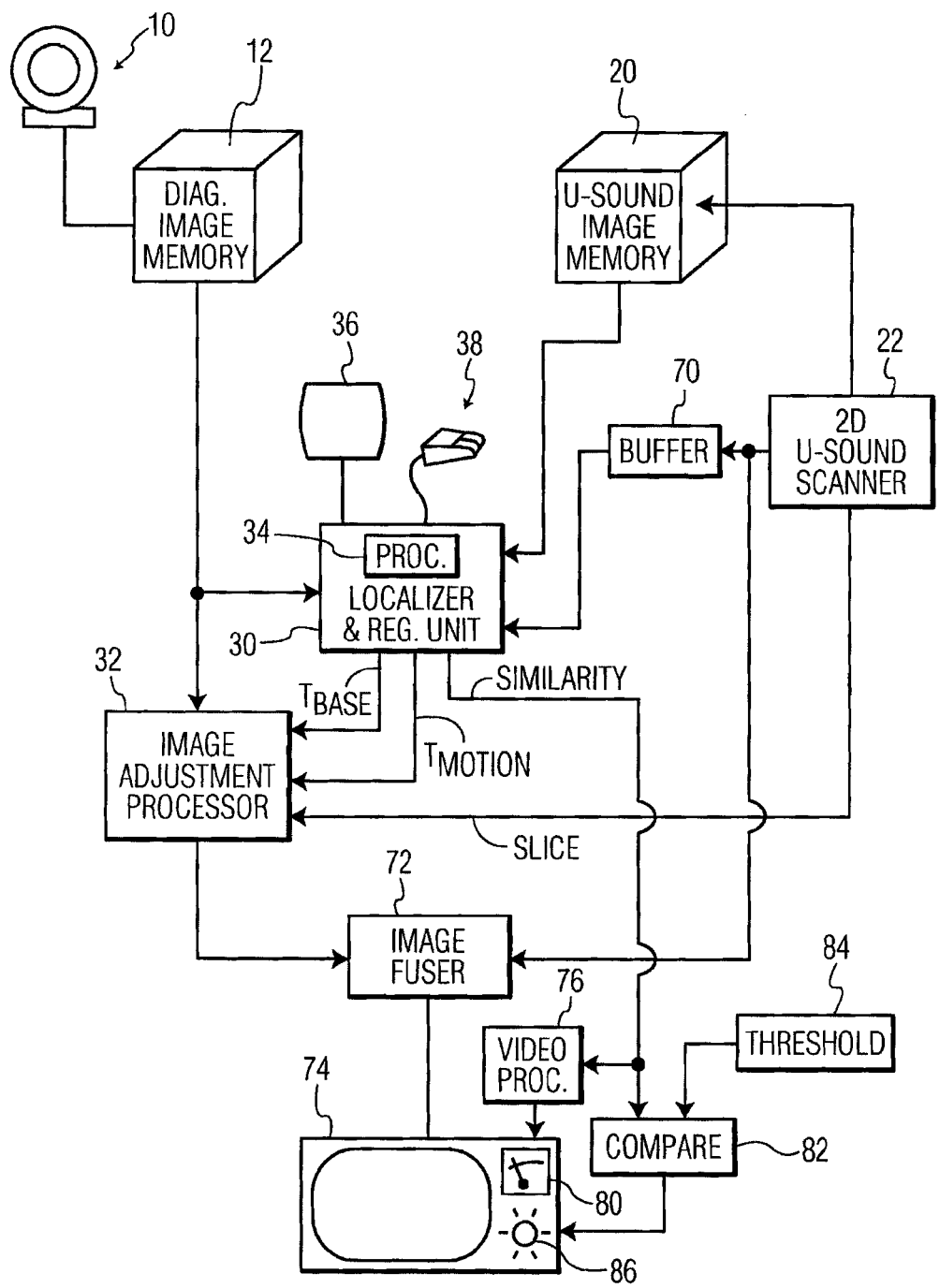
FIG. 1 is a diagrammatic illustration of a closed loop registration control.

With reference to FIG. 1, a 3D diagnostic volume image of a target region, such as a magnetic resonance (MR) image or CT image is generated by a scanner 10 and stored in a diagnostic volume image memory 12. The 3D diagnostic volume image of the target region is generated prior to a biopsy procedure. Although described in terms of 3D images, 4D and higher dimensional images are also contemplated. For example, images of an organ that moves cyclically can be generated in four dimensions with the fourth dimension being time or position in the cycle. The 3D diagnostic volume image may be generated, for example, in a magnetic resonance imaging system immediately prior to the biopsy procedure, hours, days, or weeks prior to the biopsy procedure, or even months or more in advance. Optimally, the 3D diagnostic volume image is generated with the patient in the same physical position as the patient will be in during the biopsy. A 3D ultrasound volume image of the same region, preferably with the patient in the same position, is generated in preparation for the procedure and stored in an ultrasound volume image memory 20. In one embodiment, a plurality of two-dimensional ultrasound images is generated using a two-dimensional ultrasound scanner 22 and compiled into the 3D ultrasound volume image. Using the same scanner to generate the 3D ultrasound volume image and two-dimensional real-time images is advantageous in that it provides inherent alignment characteristics from the common position of the ultrasound sensor.

A localizer and registration unit 30 is connected with the diagnostic volume image memory 12 and the ultrasound volume image memory 20 to receive the corresponding 3D volume images therefrom. The localizer and registration unit and registration determines a baseline transform $T_{base}$ which registers the 3D diagnostic volume images and 3D ultrasound volume images. The baseline transform describes the transformation which can operate on the 3D diagnostic volume image to transform it into full alignment with the 3D ultrasound volume image. The baseline transform is provided to an image adjustment processor or program 32 which can transform the 3D diagnostic volume image or a portion of it into registration with the 3D ultrasound volume image. This registration can be iteratively performed until an optimal baseline transform is generated.

The localizer and registration unit 30 includes one or more processors 34 which are programmed to perform automatic or semiautomatic registration methods. The localizer and registration unit is connected with a display 36 for showing superimposed images and an operator input device 38, such as a mouse or keyboard, to receive instructions from a clinician for improving registration of the superimposed images during manual or semiautomatic registration procedures.

Figure 2:
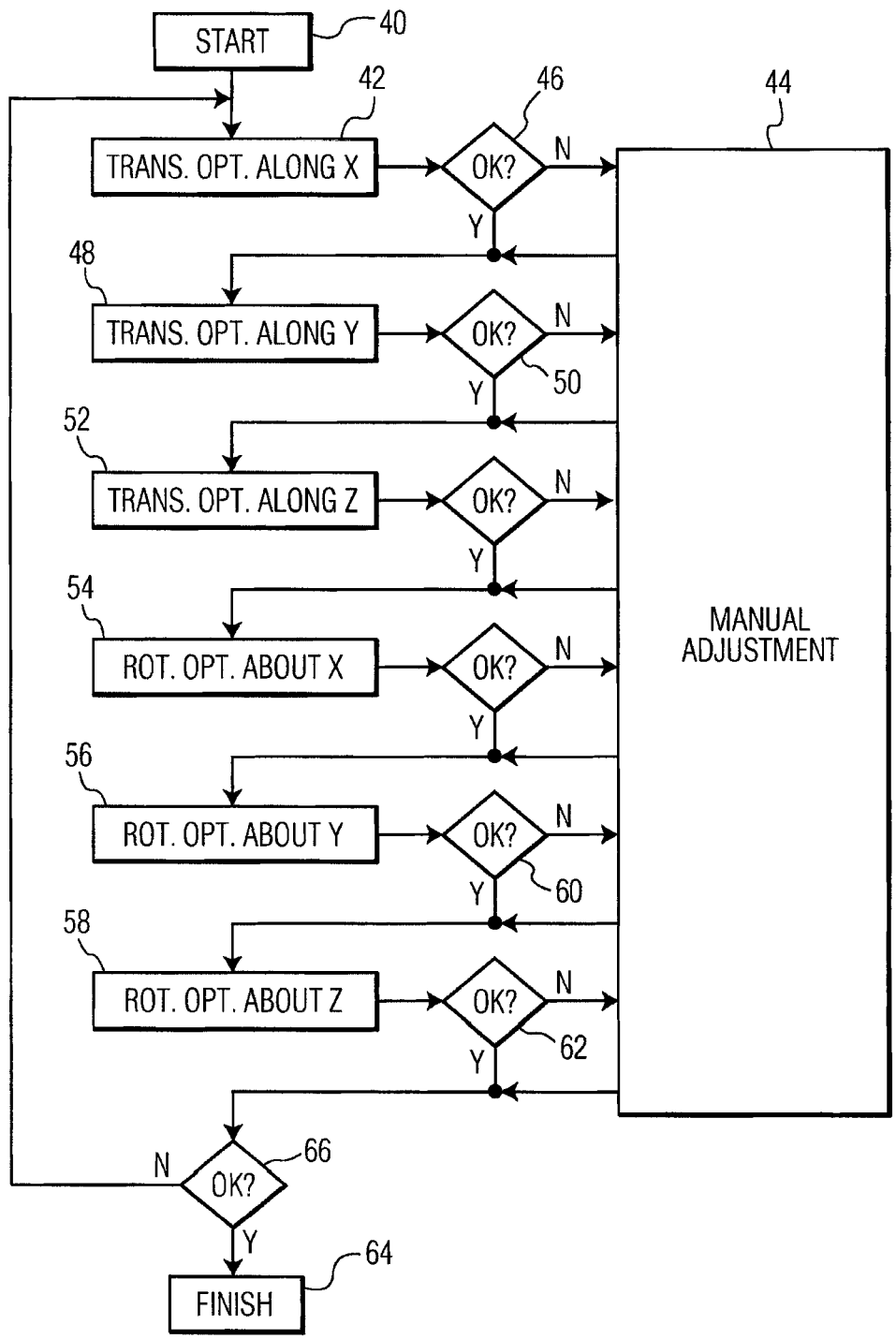
FIG. 2 is a diagrammatic illustration of a semi-automatic image registration process; and, FIG. 3 describes a method of real-time image registration.

Various localization techniques can be utilized to determine the baseline transform. This can be a manual technique, an automatic technique, or a semi-automatic technique. FIG. 2 describes an advantageous semi-automatic technique. Rather than trying to align the 3D diagnostic volume image and the 3D ultrasound volume image in all dimensions concurrently, which tends to fall into local minima, the technique of FIG. 2 performs the alignment independently along each dimension or small subset of the dimensions.

When the registration process starts 40, an automated registration process 42 optimizes the registration along one dimension, e.g., the x-dimension. This optimization may be based on any of various similarity measures, such as surface-based registration, image-based registration, mutual information-based registration, correlation ratio-based registration, or other similarity measures. Once the automated registration processor determines a proposed optimum registration, an operator reviews the registration, performs a manual adjustment 44, if necessary, and approves 46 the first dimension registration. This process is repeated with an automated optimization of the next dimension, e.g., the y-dimension 48, manual adjustment 44, if necessary, and approval 50. Analogously, automated optimization 52 along a third translation optimization dimension, e.g., the z-dimension is performed, any appropriate manual adjustments performed 44, and the translation approved 52. In the next dimension registration, an automated rotational optimization 54 is performed about one dimension, e.g., about the x-axis. Manual adjustments 44, if necessary, are performed and the registration approved. This same process is repeated for rotational optimization 56, 58 about other dimensions, e.g., the y- and z-dimensions, manual adjustments are made 44, if needed, and the registrations are approved 60, 62. Optionally, additional registrations in additional dimensions can be performed such as magnification/minification, non-rigid registrations, and the like. Each such additional dimension registration is again manually adjusted, if necessary, and approved by the clinician. If the clinician is satisfied with the registered images, the registration is completed 64. If the clinician believes that the registration can be improved, the clinician sends 66 the registration back to start 40 and the process is repeated. This process can be iteratively repeated until the clinician is satisfied with the alignment. It should be noted that different similarity measures can be used in each iteration or in different dimensions in the same iteration. After the automated alignment along any dimension, the clinician can determine that the similarity measure used by the automated registration process did not work optimally, select a different similarity measure, and re-run the automatic registration process along that dimension again. As another alternative, the registration optimization may be performed relative to more than one dimension or parameter at a time, e.g., a subset of the dimensions to be registered. As another alternative, some registration dimensions can be skipped either initially or on the iterations. The decision to skip can be manually input or based on defined or user preference settings.

With reference again to FIG. 1, during an ultrasound-guided biopsy procedure, the real-time ultrasound scanner 22 generates a series of real-time two-dimensional ultrasound images during the biopsy procedure. These 2D real-time ultrasound images optionally are stored in a buffer 70. Each individual slice or groups of slices in the nature of slab are conveyed to the localizer and registration unit 30. The localizer and registration unit 30 registers the slice or slab ultrasound images from the two-dimensional real-time ultrasound scanner 22 with a corresponding portion of the 3D ultrasound volume image from the ultrasound volume image memory 20 and determines a corresponding motion correction transform $T_{motion}$ which brings these two ultrasound images into registration. In this manner, as tissue in the target region moves or distorts, e.g., due to advancement of the biopsy needle, the localizer and registration unit 30 determines the motion correction transform $T_{motion}$ which transforms the corresponding portion of the 3D ultrasound volume image into registration with the real-time ultrasound image(s).

Because the localizer and registration unit 30 compares ultrasound images with ultrasound images, there are a variety of similarity measures that can be utilized successfully in automatic registration processes, such as the similarity measures listed above.

As each real-time ultrasound image is generated, it is conveyed in real-time to an image fuser 72. From the geometry of the real-time ultrasound scanner 22, the real-time ultrasound scanner determines a geometry and location relative to the target region of each real-time 2D or slice ultrasound image. This slice information is transmitted to the image adjustment processor 32 which causes the image transform processor to retrieve and transform a corresponding slice or other portion of the 3D diagnostic volume image with the baseline transform $T_{base}$ and the most recently determined motion correction transform $T_{motion}$. The transformed slice or other portion of the 3D diagnostic volume image is conveyed to the fuser 72. In this manner, the corresponding portion of the 3D diagnostic volume image is transformed into alignment with each real-time ultrasound slice or 2D image in real-time. The fused images are conveyed to a display 74 for display.

The motion correction transform $T_{motion}$ can be generated after each real-time ultrasound image, after a preselected number of the real-time ultrasound images, or upon an operator request to update the motion correction transform.

As the localizer and registration unit 30 determines the motion correction transform, it also determines a measure of the similarity between the 3D ultrasound volume image and the real-time ultrasound images. This similarity measure is converted by a video display processor 76 into appropriate format for display on the display 74. This similarity measure may be displayed in a graphic display 80 which moves from low to high to indicate the current degree of similarity. Alternately, the similarity measure can be displayed as a number or percentage. As another option, the similarity measure is compared 82 with a threshold 84. If the similarity measure becomes dissimilar beyond a preselected threshold, a warning is conveyed to the technician performing the biopsy. Optionally, the display can be in the form of a blinking or colored warning light 86 which appears on the display 74.

Figure 3:
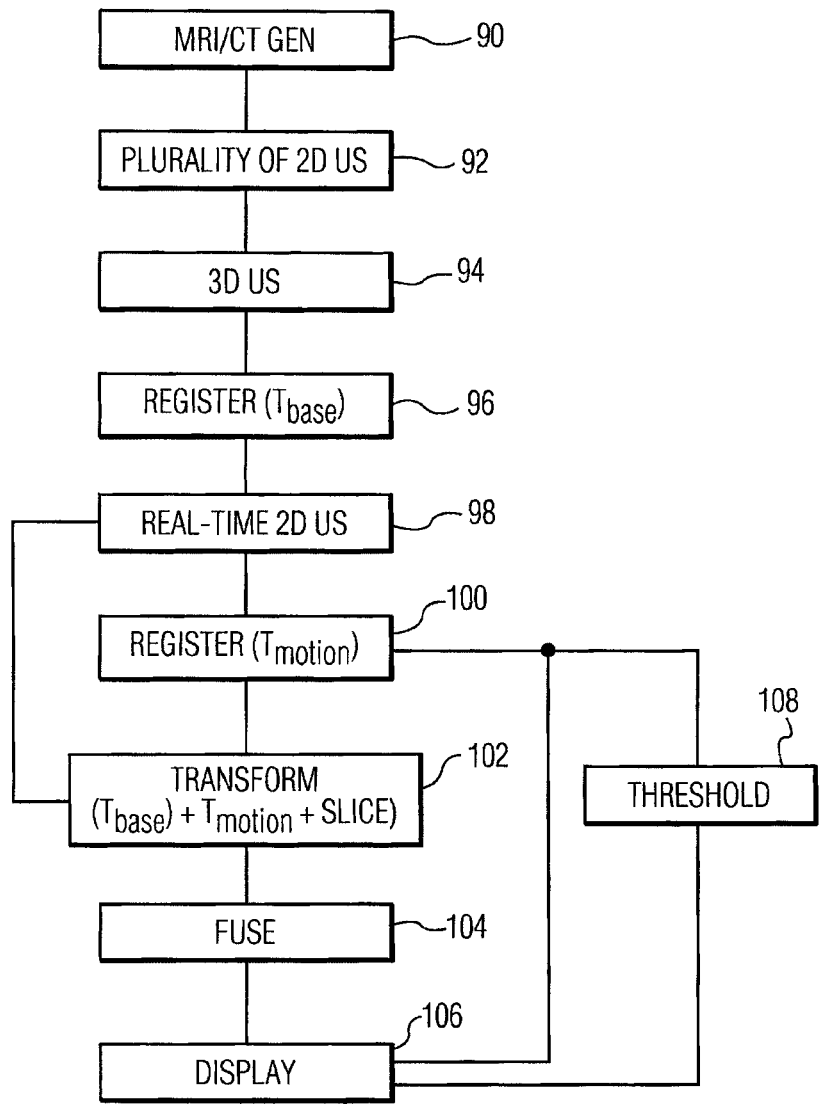

With reference to FIG. 3, the 3D diagnostic volume image, such as a MR or CT image, is generated 90. A plurality of 2D ultrasound images is generated 92 and merged into a 3D ultrasound volume image 94. The 3D diagnostic volume image and the 3D ultrasound volume image are registered 96 to generate a baseline transform $T_{base}$. In one embodiment, the registration process is performed in accordance with method of FIG. 2 described above. A series of real-time ultrasound images is generated 98. Each real-time ultrasound image or group of real-time ultrasound images is registered 100 with the 3D ultrasound volume image or a corresponding portion of it to develop a motion correction transform $T_{motion}$. The 3D diagnostic volume image or a portion corresponding to the real-time ultrasound image is transformed 102 in accordance with the baseline and motion correction transforms. Each real-time ultrasound image is fused with the corresponding portion of the transformed 3D diagnostic volume image 104. It is to be appreciated that the slice from the 3D diagnostic volume image is not limited to orthogonal slices but includes oblique slices, and the like. Non-planar slices and slabs are also contemplated. Each of the real-time ultrasound images is displayed 106 fused with the corresponding portion of the 3D diagnostic image.

Optionally, the registration 100 of the real-time and 3D ultrasound volume images also generates a signal indicative of the similarity measure which is also displayed. As another option, the similarity measure is compared with the threshold 108 and, if the similarity measure is dissimilar beyond the threshold, a warning is presented to the clinician in the display step 106.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. An image registration apparatus comprising:
a first scanner configured to, a first amount of time prior to a procedure, generate and store at least one diagnostic image of a target area in 3D and higher dimensions;
a second scanner configured to, a second amount of time prior to the procedure, generate and store at least one ultrasound image of the target area in 3D and higher dimensions, and during the procedure, generate real-time images in 2D, the second amount of time being shorter than the first amount of time;
a localizer configured to determine
a baseline transform to iteratively register the respective diagnostic and ultrasound images of the target area in 3D and higher dimensions,
a motion correction transform to register the respective real-time and stored ultrasound images, and
a similarity measure indicative of a degree of similarity between the registered real-time images and the ultrasound image; and
an adjustment processor configured to adjust at least a selected portion of the diagnostic image in accordance with the baseline transform and the motion correction transform and to correct for motion within the target area using the similarity measure.

2. The apparatus according to claim 1, wherein the localizer includes a spatial tracking system configured to determine the spatial position and orientation of a probe during the acquisition of the ultrasound image and during the acquisition of the real-time images.

3. The apparatus according to claim 2, wherein the spatial tracking system includes at least one of an electro-magnetic, optical, and ultrasonic tracking system, the second scanner comprises an ultrasound scanner, and the probe comprises an ultrasound probe.

4. The apparatus according to claim 1, wherein the localizer comprises:
a processor configured to iteratively apply an automated registration relative to each of a plurality of dimensions; and
a user interface configured for review, adjustment and approval of the automated registrations.

5. The apparatus according to claim 1, wherein the diagnostic image is selected from at least a magnetic resonance (MR) image or CT image.

6. The apparatus according to claim 1, wherein the adjustment processor is configured to receive the motion correction transform for adjusting at least a portion of the diagnostic image and the ultrasound image, and the motion correction transform for registering at least a corresponding portion of the ultrasound image and the real-time images.

7. The apparatus according to claim 6, wherein the second scanner is configured to
generate a series of the real-time images, and
convey a 2D image location signal to the adjustment processor for use in identifying the portion of diagnostic image to be adjusted in accordance with the baseline and motion correction transforms.

8. The apparatus according to claim 7, wherein the second scanner and the localizer are configured to convey the series of the real-time images for compilation into the ultrasound image.

9. The apparatus according to claim 6, further comprising:
an image fuser configured to fuse each real-time image with the corresponding, transformed portion of the diagnostic image into a fused image; and,
a display configured to display the fused image.

10. The apparatus according to claim 9, further comprising:
a buffer memory configured to buffer the series of the real-time images, the localizer configured to register the stored series of real-time images with the ultrasound image to generate the motion correction transform, the motion correction transform is updated after a plurality of real-time images are generated.

11. The apparatus according to claim 1, wherein the display is further configured to display a visual representation of the similarity measure.

12. The apparatus according to claim 1, wherein the localizer comprises one or more processors, which, for each of the dimensions, are configured to iteratively optimize registration along the dimension;
display the diagnostic image and the ultrasound image registered in the dimension; and
receive at least one of a manual adjustment to and operator approval of the registration.

13. A method of registering ultrasound image with diagnostic images and real-time images of a target region, the method comprising acts of:
generating a series of real-time images of the target region in 2D during a procedure, at least one ultrasound image of a target area in 3D a first time before the procedure, and at least one diagnostic image of a target area in 3D and higher dimensions a second time before the procedure, wherein the second time is longer than the first time;
registering the diagnostic images with the ultrasound images to determine a baseline correction transform therebetween, and the real-time images with the ultrasound image to determine a motion correction transform therebetween;
determining a similarity measure indicative of a degree of similarity between the registered real-time images and the ultrasound image; and
operating on at least a portion of the diagnostic image with the baseline transform and the motion correction transform to transform a corresponding portion of the diagnostic image into registration with the real-time images and correct for motion within the target area using the similarity measure.

14. The method according to claim 13, wherein the diagnostic image is one of 3D and higher dimensions and the ultrasound image is one of 3D and higher dimensions, and registering the diagnostic image with the ultrasound image comprises acts of:
for each of the dimensions
automatically optimizing registration along the dimension;
depicting the diagnostic image and the ultrasound image registered in the dimension;
receiving at least one of a manual adjustment to and operator approval of the registration; and
determining a baseline transform which registers the diagnostic image and the ultrasound image.

15. The method according to claim 14, wherein optimizing, depicting, receiving, and determining are performed iteratively.

16. The method according to claim 15, further comprising acts of:
generating a plurality of two-dimensional ultrasound images; and,
combining the two-dimensional ultrasound images to form the ultrasound image.

17. The method according to claim 13, further comprising acts of:
fusing each real-time image with the corresponding transformed portion of the diagnostic image to form a fused image; and
displaying the fused image.

18. The method according to claim 13, further comprising an act of displaying a visual representation the similarity measure.

19. An image registering method comprising acts of:
registering a diagnostic image of a target region generated in 3D and higher dimensions a first amount of time prior to a procedure and an ultrasound image of the target region generated in 3D a second amount of time prior to the procedure to determine a baseline transform for transforming the diagnostic image and the ultrasound image;
generating a series of real-time ultrasound images in 2D during the procedure;
registering the real-time ultrasound images with the ultrasound image to generate a motion correction transform for transforming at least a portion of the ultrasound image and the real-time ultrasound image;
determining a similarity measure indicative of a degree of similarity between the registered real-time images and the ultrasound image; and
operating on at least a corresponding portion of the diagnostic image with the baseline transform and the motion correction transform to bring at least the corresponding portion of the diagnostic image into registration with the real-time ultrasound image and correct for motion within the target area using the similarity measure.

20. The method according to claim 19, further comprising acts of:
fusing each real-time ultrasound image with a corresponding portion of the diagnostic image that has been operated on by the baseline transform and the motion correction transform to generate a fused image; and
displaying the fused image.

21. The method according to claim 19, further comprising acts of:
buffering a plurality of the real-time ultrasound images;
registering the buffered plurality of real-time ultrasound images as a group with the ultrasound image to generate the motion correction transform.

22. The method according to claim 19, further comprising an act displaying a visual representation of the similarity measure.

23. The method according to claim 19, wherein the diagnostic image is a magnetic resonance image.

24. A non-transitory computer readable medium embodying computer software, which when executed by a processor, performs an image registering method comprising acts of:
generating a baseline transform for transforming a diagnostic image generated in 3D and higher dimensions a first amount of time prior to a procedure and a ultrasound image generated in 3D a second amount of time prior to the procedure;
registering a series of real-time ultrasonic images generated in 2D during the procedure with the ultrasound images to generate motion correction transforms for transforming at least a portion of the ultrasound image;
determining a similarity measure indicative of a degree of similarity between the registered real-time images and the ultrasound image; and
operating on at least a corresponding portion of the diagnostic image with the baseline and motion correction transforms to bring at least a portion of the corresponding portion of the diagnostic image into registration with the real-time ultrasonic image and correct for motion within the target area using the similarity measure.

25. The non-transitory computer readable medium according to claim 24, wherein the method further comprising an act of: displaying a visual representation of the similarity measure.

* * * * *